(12) United States Patent
Cooper et al.

(10) Patent No.: US 8,612,908 B2
(45) Date of Patent: Dec. 17, 2013

(54) METHOD AND SYSTEM FOR VERIFICATION OF ELECTRICAL CIRCUIT DESIGNS AT PROCESS, VOLTAGE, AND TEMPERATURE CORNERS

(71) Applicant: Solido Design Automation Inc., Saskatoon (CA)

(72) Inventors: Joel Cooper, Vancouver (CA); Trent Lorne McConaghy, Saskatoon (CA)

(73) Assignee: Solido Design Automation Inc., Saskatoon, Saskatchewan (CA)

( * ) Notice: Subject to any disclaimer, the term of this patent is extended or adjusted under 35 U.S.C. 154(b) by 0 days.

(21) Appl. No.: 13/671,124

(22) Filed: Nov. 7, 2012

(65) Prior Publication Data

US 2013/0117721 A1    May 9, 2013

Related U.S. Application Data

(60) Provisional application No. 61/557,061, filed on Nov. 8, 2011.

(51) Int. Cl.
*G06F 17/50* (2006.01)

(52) U.S. Cl.
USPC ........................................................ 716/106

(58) Field of Classification Search
USPC ........................................................ 716/106
See application file for complete search history.

(56) References Cited

U.S. PATENT DOCUMENTS

| | | | | |
|---|---|---|---|---|
| 2008/0046846 | A1* | 2/2008 | Chew et al. | 716/2 |
| 2008/0209372 | A1* | 8/2008 | Buck et al. | 716/6 |
| 2009/0031271 | A1* | 1/2009 | White et al. | 716/10 |

OTHER PUBLICATIONS

Sasena, "Flexibility and Efficiency Enhancements for Constrained Global Design Optimization with Kriging Approximations", PhD Thesis, University of Michigan, 2002, 237 pages.
Cressie, "Geostatistics", The American Statistician, vol. 43, No. 4, Nov. 1989, pp. 197-202.
Land et al., "An Automatic Method of Solving Discrete Programming Problems", Econometrica, vol. 28, No. 3, Jul. 1960, pp. 497-520.
Andramonov et al., "Cutting Angle Methods in Global Optimization", Applied Mathematics Letters, vol. 12, issue 3, May, 999, pp. 95-100.
Rubinstein, "Optimiziation of Computer Simulation Models with Rare Events", European Journal of Operations Research, vol. 99, 1997, pp. 89-112.
Kirkpatrick et al., "Optimization by Simulated Annealing", Science New Series, vol. 220, No. 4598, May 13, 1983, pp. 671-680.
Beyer et al., "Evolution Strategies", Natural Computing, vol. 1, 2002, pp. 3-52.
Kennedy et al., "Particle Swarm Optimization", Proceedings of IEEE International Conference on Neural Networks, IV, 1995, pp. 942-1948.

* cited by examiner

*Primary Examiner* — Jack Chiang
*Assistant Examiner* — Mohammed Alam
(74) *Attorney, Agent, or Firm* — Louis B. Allard; Borden Ladner Gervais LLP

(57) ABSTRACT

A method for finding the process, voltage, temperature, parasitics, and power settings (PVTPP) corner at which an electrical circuit design has the worst-case optimum simulated output performance. The method uses a global optimization process in a series of iterations that aim to uncover the PVTPP corner at which the ECD has the worst-case output value. By using the present method, a designer does not have to simulate the ECD at each and every PVTPP corner, which can same considerable time or compute effort. Examples using Model-Building Optimization are provided.

22 Claims, 11 Drawing Sheets

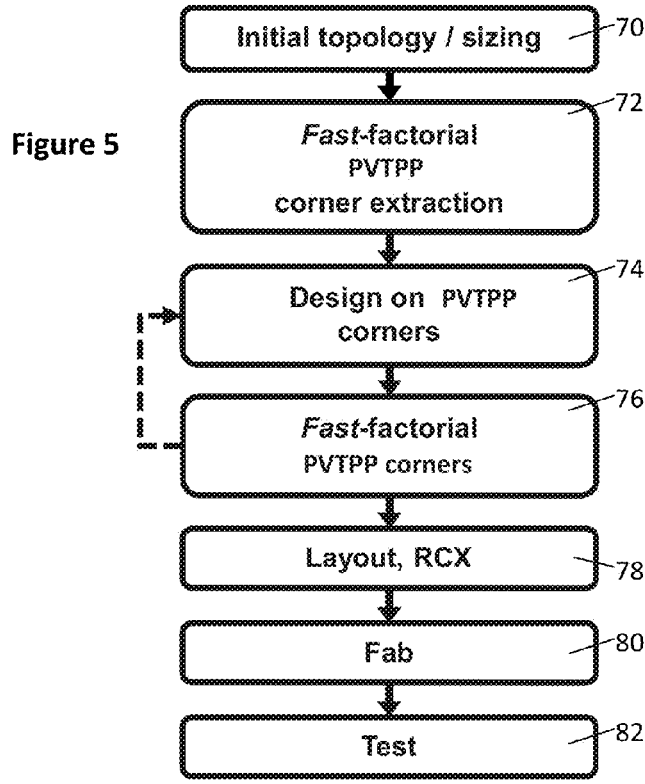
Figure 5
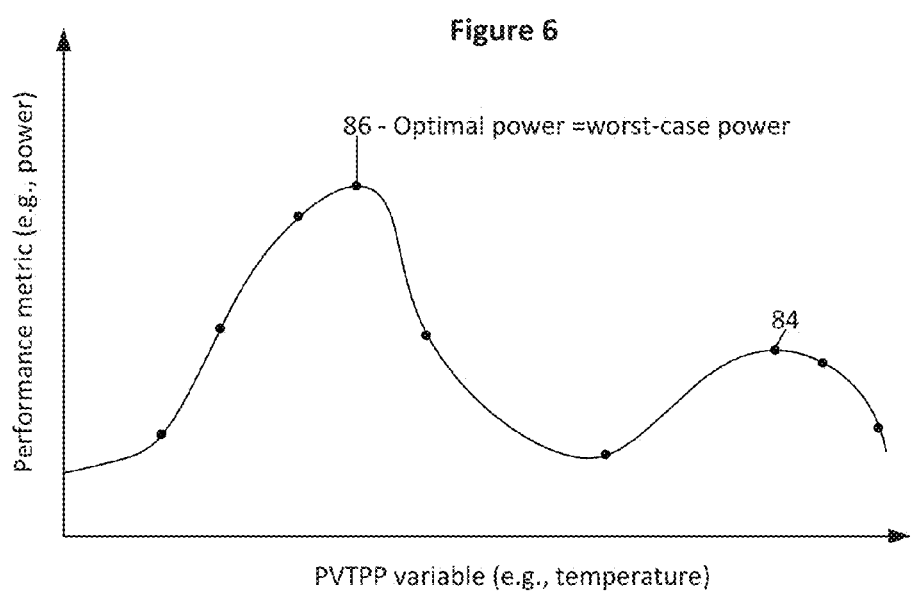

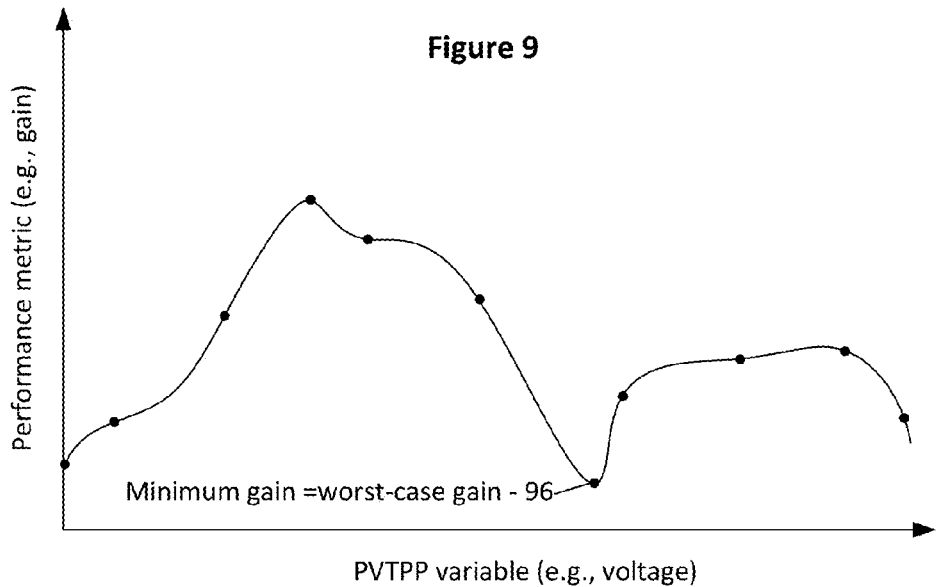
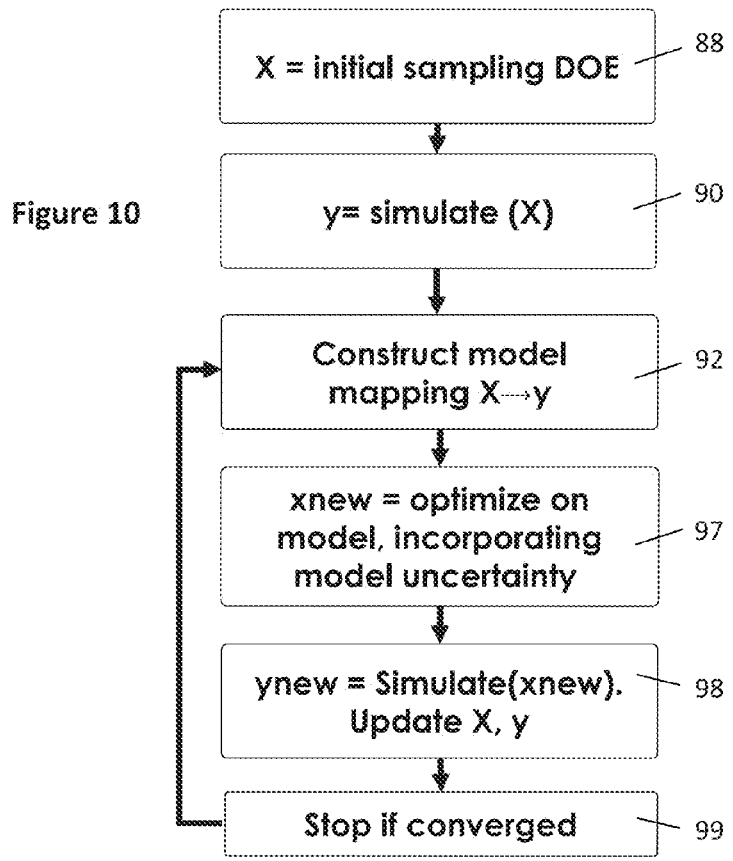

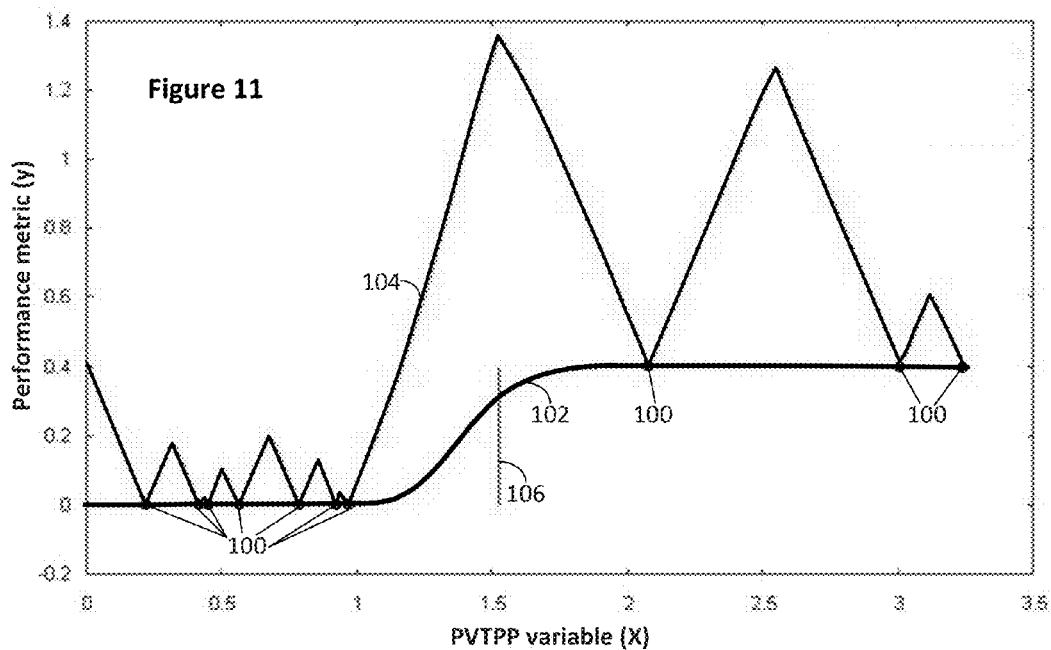
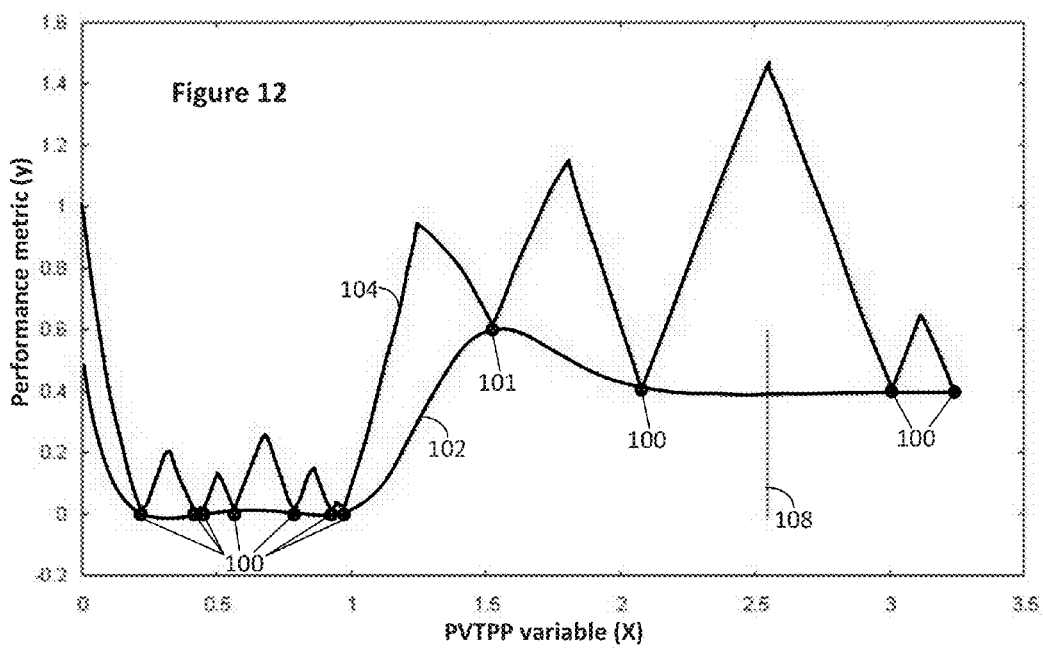

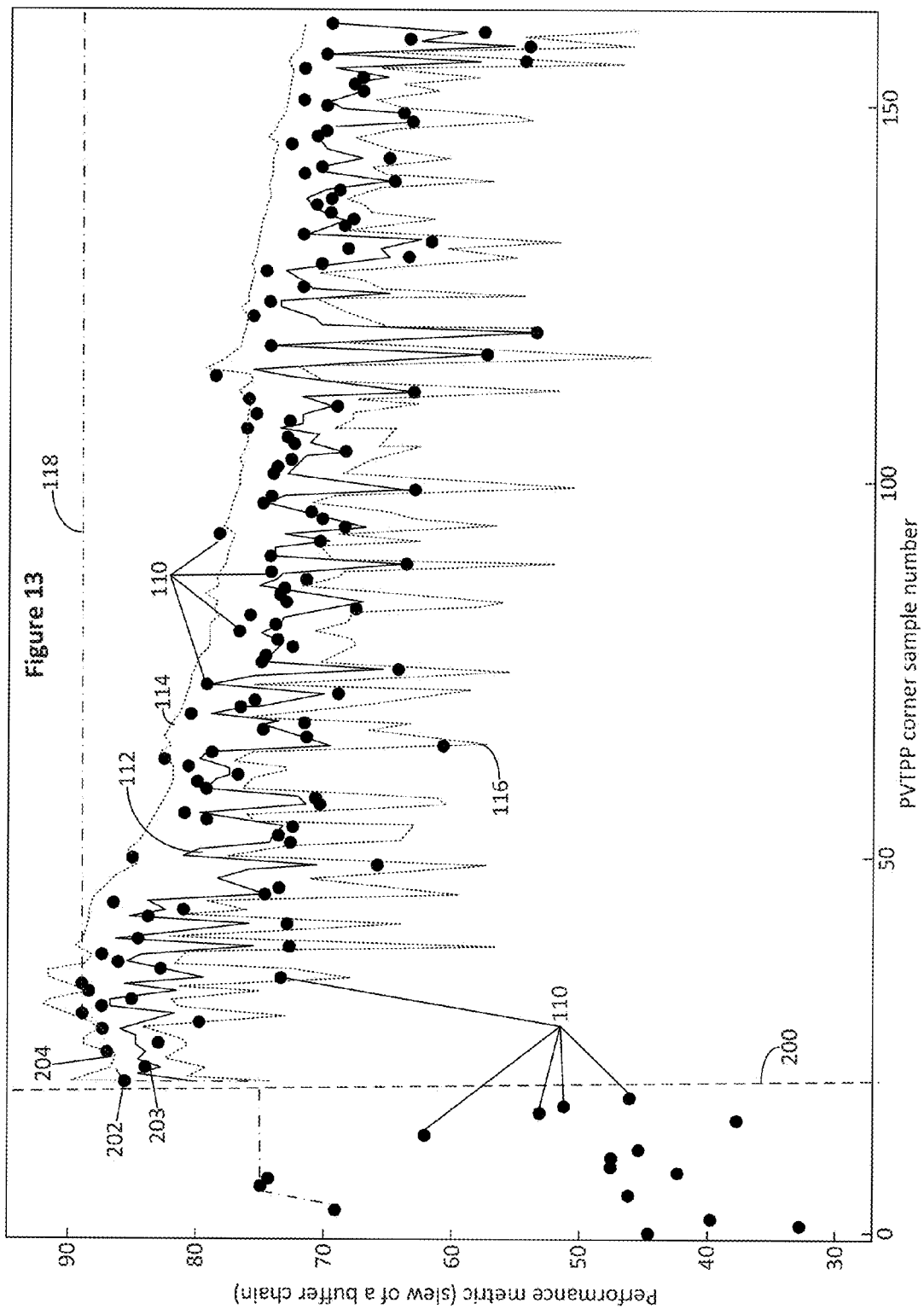

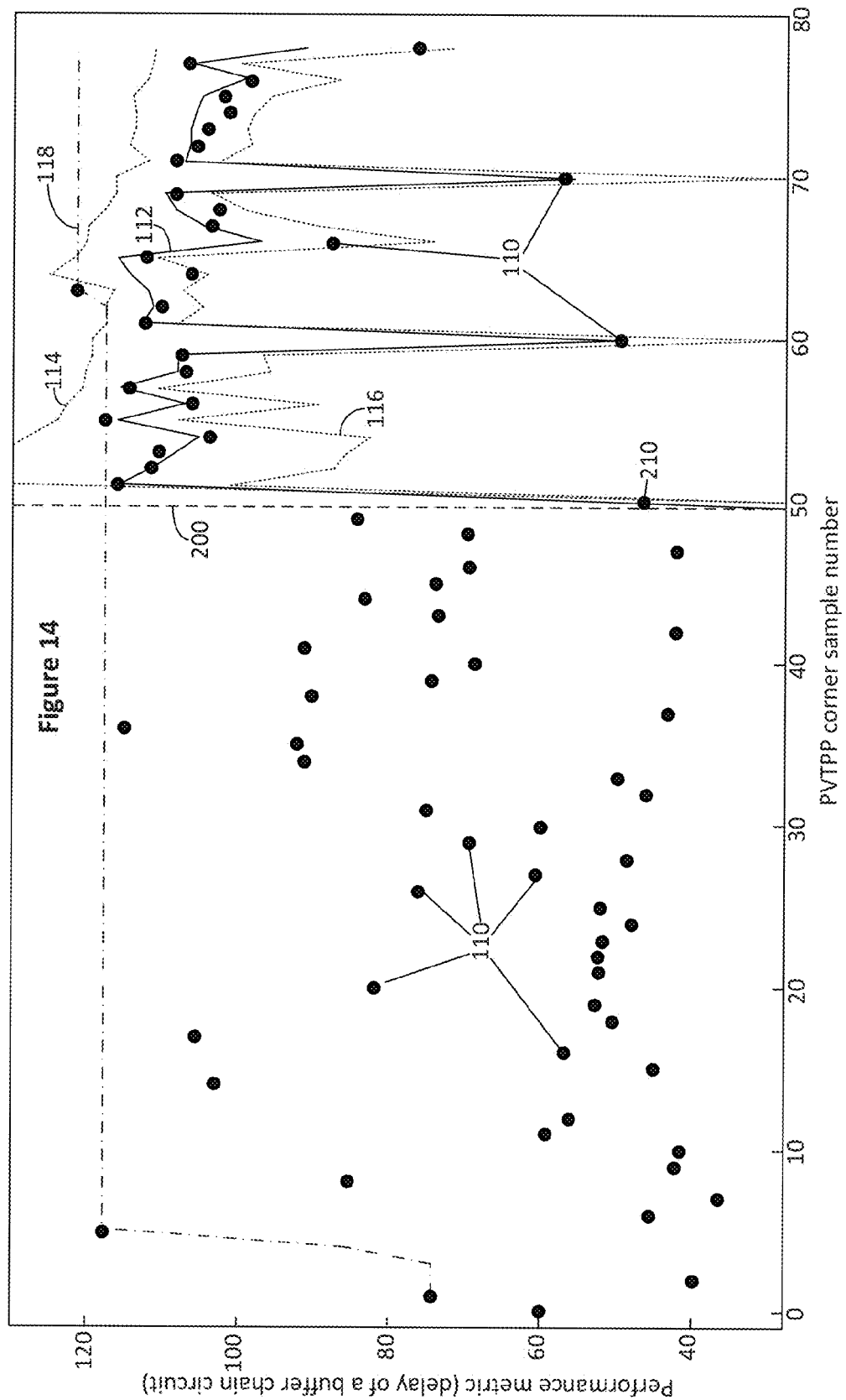

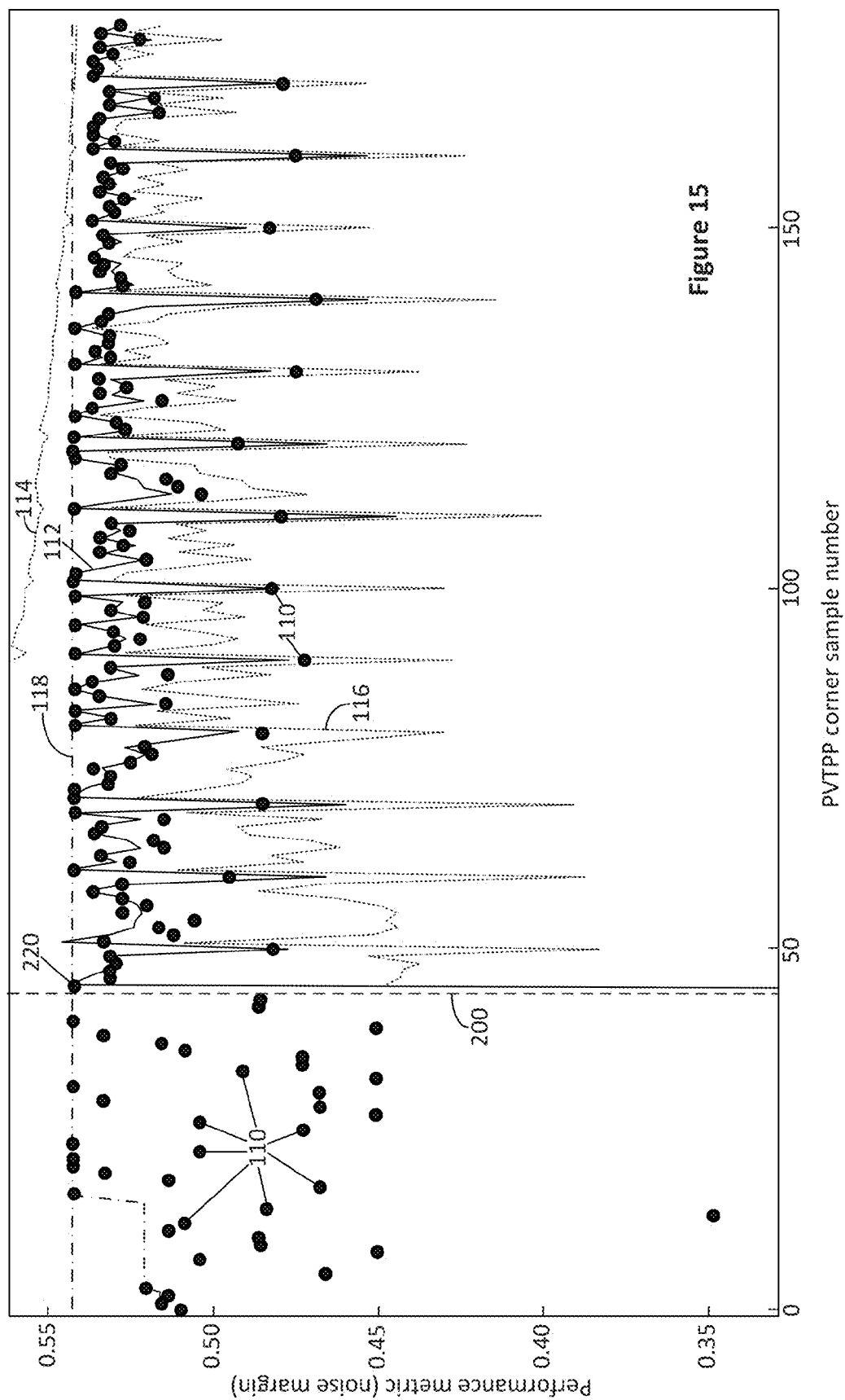

METHOD AND SYSTEM FOR VERIFICATION OF ELECTRICAL CIRCUIT DESIGNS AT PROCESS, VOLTAGE, AND TEMPERATURE CORNERS

FIELD

The present disclosure relates generally to electrical circuit designs. More particularly, the present disclosure relates to designing electrical circuits under process, voltage, and temperature variations.

BACKGROUND

Process, voltage, temperature, parasitics, and power (PVTPP) variations are often modeled as a set of PVTPP corners. Traditionally, without considering parasitics and power variations, only a handful of corners have been necessary: with FF (fast fast) and SS (slow slow) process corners, plus extreme values for voltage and temperature. The total number of combinations in such a case is $2^3=8$, which is the number of possible corners (PVTPP corners).

With modern processes, many more process corners are often needed to properly bracket process variation across different device types. Furthermore, transistors are smaller, performance margins are smaller, voltages are lower, and there may be multiple supply voltages. To bracket these variations, more variables with more values per variable are needed. This leads to more corners.

As shown above, a circuit with 3 variables having 2 values each gave $2^3=8$ corners. Now, even a basic analysis of an electrical circuit design having four device types (e.g. NMOS, PMOS, resistor, capacitor) and 4 other variables (e.g. temperature, voltage, bias, load) with 3 values each results in $3^8=6,561$ corners.

The problem gets worse with double patterning lithography (DPL), where the RC (resistor capacitor) parasitics among the masks degrade performance. To account for these, a tactic is to treat the RC parasitics as corners, leading to about a fifteen times increase in the number of model sets, and therefore a fifteen times increase in the total number of corners.

Further, power verification needs corners for each power setting (e.g. quick boot, cruising, and standby), which also increases the total number of corners. In general, there is a set of variables (power, voltage, temperature, parasitics, power setting, etc), and each variable has a set of values. The designer is interested in finding the value for each variable (the "corner") that gives the worst-case performance (minimum or maximum performance) of all possible corners. The common element among these PVTPP variables is that the design performance is judged on each combination of conditions (the whole set of possible PVTPP corners) and it is the worst-case performance among the whole set of possible PVTPP corners that is of greatest concern. In this framework, the PVTPP variables do not follow a probability distribution; the worst-case must be found in the whole space of PVTPP variables. Of note, in the context of the present disclosure, PVTPP variables exclude global process variables modeled using a distribution, and local process variables modeled using a distribution.

The problem facing circuit designers is that simulating each corner can take several seconds, minutes, or even hours for longer analyses. To simulate all possible corners could take hours or even days, which is too time-consuming. Designers may cope by guessing which corners cause the worst-case performance, but that is risky: a wrong guess could mean that the design has not accounted for the true worst-case, which means failure in testing, followed by a re-spin of the design, or worse, failure in the field.

Finding the worst-case PVTPP corners is part a design loop where the designer (circuit designer) will be changing circuit design variables such as Ws (widths) and Ls (lengths), in order to find the design with the best performance under the worst-case PVTPP conditions.

Different approaches (flows) for designing/verifying electrical circuit designs (ECDs) are shown at FIGS. 1-5. The time taken for each flow is measured and compared for an exemplary ECD, which is VCO of a PLL, from the TSMC AMS Reference Flow 2.0, on 28 nm TSMC process. The ECD in question has two output performance measures, namely duty cycle and gain, with specifications (specs) of: 48.3<duty cycle<51.7%, and 3<Gain<4.4 GHz/V. The variables of the ECD are temperature, $V_{ah,vdd}$, $V_{a,vdd}$, $V_{d,vdd}$, and 15 model sets (FF, TT, SS, etc.). All combinations of all values of variables lead to 3375 corners (full-factorial scenario). Since there are two output performance measures, and each output has a lower and upper bound, there are up to 2×2=4 PVTPP corners that cause worst-case performance. We used a popular commercial simulator to simulate the ECD.

Because the flows of FIGS. 1-5 include changing design variables, we need a way to compare different approaches in a fair fashion, which is independent of designer skill and how much knowledge the designer has about the circuit. We do this with a simple, reasonable approximation: in the design loop, the designer considers 50 designs. Also, since this is the age of multi-core and multi-machine parallel processing, we always consider each approach to have 10 cores running in parallel.

FIG. 1 shows a prior art flow in which a designer simply chooses to simulate all possible PVTPP corners at each iteration of the electrical circuit design (ECD). At action 50, the topology and initial sizing of the ECD are set. At action 52, the ECD goes through multiple iterations of sizing and testing at all possible PVTPP corners. At action 54, the final ECD proceeds to layout and parasitic extraction (RCX). At action 56, the ECD proceeds to fabrication and is tested at action 58. The flow of FIG. 1 is very accurate (to the extent that PVTPP variation is an accurate model of variation). However, since each of 50 design iterations takes 3375 simulations (e.g., Simulation Program with Integrated Circuit Emphasis (SPICE) simulations), then it is very slow, taking 13.5 days even when on 10 parallel cores.

FIG. 2 shows another prior art flow where the designer guesses worst case PVTPP corners. After choosing a topology and initial sizing of the ECD at action 50, the designer uses his expertise and experience with the ECD to guess, at action 60, which PVTPP corners cause worst-case performance, without any simulations. Then, he simply designs against those corners at action 62. The advantage of this approach is its speed, because it requires no simulations to select corners, and each design iteration only has to be simulated on the four selected corners (upper and lower specification for each of two outputs). The disadvantage is accuracy or reliability: if the designer's guess of worst-case PVTPP corner was wrong, then the estimate of worst-case performance is overly optimistic. This can be an important issue. For example, in power verification, it could mean that the circuit may not hit the power budget. This in turn translates, for example, into poor battery life on mobile devices.

FIG. 3 shows another prior art flow, which is similar to that of FIG. 2 but comprises a verification action 64 that runs all combinations of PVTPP corners (full-factorial) after the design step. This ensures that the circuit is verified against the target specs (performance specifications). However, it is possible that the verification step found new worst-case PVTPP corners that make the ECD fail specs, or that made the ECD have worse performances than the performance on the current PVTPP corners. To pass against these new PVTPP corners, the design needs to be improved on these corners, and verified again. This takes more simulations and time.

Overall, the flow of FIG. 3 is more accurate than the flow of FIG. 2, but the full-factorial steps are quite slow, which make the overall runtime quite slow (15.2 hours on our example circuit). Also, the extra design round is non-ideal.

FIG. 4 shows another prior art flow that addresses an issue of the flow of FIG. 3, which needs an extra design round because the initially chosen corners likely did not represent the worst-case.

One of the concepts of the flow of FIG. 4 is to simulate, at action 66, all corner combinations (full-factorial) after the topology and initial sizing of the ECD are set, to "extract" good worst-case PVTPP corners. Then, the user designs against these corners. Subsequently, in case there were strong interactions between design variables and PVTPP variables, the user runs full-factorial PVT. Usually, PVTPP corners that were extracted earlier will remain as the worst-case corners; though if not, the user designs against the new worst-case corners and verifies again.

Overall, the flow of FIG. 4 has a comparable runtime and accuracy to the flow of FIG. 3, but typically only needs one design round (instead of two for the flow of FIG. 3) because PVTPP design is always against good corners. The flow of FIG. 4 is accurate, but still fairly slow because it has to run full-factorial PVTPP twice (14.2 hours on our example circuit).

Therefore, improvements in designing electrical circuits under process, voltage, and temperature variations are desirable.

SUMMARY

In a first aspect, the present disclosure provides, in relation to an electrical circuit design (ECD), the ECD having a defined topology and design variables with fixed design variable values, the ECD also having associated thereto at least one of process, voltage, temperature, parasitics and power settings (PVTPP) variables, the PVTPP variables having associated thereto a total number of PVTPP corners, the ECD also having associated thereto a performance metric, a method of finding the PVTPP corner with the worst-case optimum simulated value of the performance metric. The method comprises: a) selecting a set of PVTPP corners from the total number of PVTPP corners; b) simulating the ECD at the set of PVTPP corners to obtain a set of simulated output values of the performance metric; c) in accordance with the set of PVTPP corners, in accordance with the set of simulated output values of the performance metric, determining if at least one pre-determined stop criterion is met. d) When at least one pre-determined stop criterion is met: i) identifying a PVTPP corner of the set of PVTPP corners that has the worst-case optimum simulated value of the performance metric; and ii) storing, in a memory, the PVTPP corner that has the worst-case optimum simulated value of the performance metric and the simulated output value of the PVTPP corner that has the worst-case optimum simulated value of the performance metric. e) When a pre-determined stop criterion is not met: i) selecting an additional PVTPP corner in accordance with the set of PVTPP corners, in accordance with the simulated output values, and in accordance with a pre-determined global optimization process; ii) adding the additional PVTPP corner to the set of PVTPP corners; iii) simulating the ECD at the additional PVTPP corner to obtain an additional simulated output value of the performance metric; iv) adding the additional simulated output value to the set of simulated output values of the performance metric; and iv) in accordance with the set of PVTPP corners, in accordance with the set of simulated output values of the performance metric, determining if at least one pre-determined stop criterion is met. f) When a pre-determined stop criterion is met, proceeding to action d; and g) when a pre-determined stop criterion is not met, repeating action e.

The stop criteria can include the additional simulated output value of the performance metric failing to improve over a pre-determined number of repetitions of action e.

The stop criteria can include the additional simulated output value of the performance metric improving by less than a pre-determined percentage over a pre-determined number of repetitions of action e.

The stop criteria can include a number of repetitions of actions e that exceeds a pre-determined maximum number of repetitions.

The stop criteria can include a pre-determined number of PVTPP corners having been simulated.

The pre-determined global optimization process can have an uncertainty associated thereto. The uncertainty can be a function of each additional PVTPP corner. The method can further comprise, after action (e)(iii), displaying the simulated value of all PVTPP corners that have been added to the set of PVTPP corners, in the sequence that the additional PVTPP corners were added to the set of PVTPP corners, and the uncertainty of the pre-determined global optimization process.

The pre-determined global optimization process can include one of model-building optimization, branch and bound optimization, multi-coordinate search optimization, simulated annealing, and an evolutionary algorithm.

When the pre-determined global optimization process is model-building optimization, action (e)(i) can include building a model of the performance metric, the model having an uncertainty, and selecting the additional PVTPP corner in accordance with the model and in accordance with the uncertainty. The model can be a Gaussian Process Model.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 5 shows a flowchart of a method of designing an electrical circuit in accordance to certain examples of the present disclosure.

FIG. 6 shows an example of a plot of a performance metric as a function of a PVTPP variable.

FIG. 9 shows a plot of gain as a function of voltage for an exemplary electrical circuit design.

FIG. 10 shows a flowchart of a method of finding the PVTPP corner with the worst-case optimum simulated output performance in accordance to certain examples of the present disclosure.

FIGS. 11 and 12 show plots of two iterations of a model-building optimization (MBO) approach of global optimization-based electrical circuit design verification in accordance with certain examples of the present disclosure.

FIG. 13 shows an example of convergence plot for an MBO-based verification algorithm in accordance with certain examples of the present disclosure.

FIG. 14 shows another example of convergence plot for an MBO-based verification algorithm in accordance with certain examples of the present disclosure.

FIG. 15 shows yet another example of convergence plot for an MBO-based verification algorithm in accordance with certain examples of the present disclosure.

DETAILED DESCRIPTION

Generally, the present disclosure provides a method for finding the process, voltage, temperature, parasitics, and power settings (PVTPP) corner with the worst-case optimum simulated output performance, for an electrical circuit design (ECD), across all possible process, PVTPP corners. The method uses a global optimization process in a series of iterations that aim to uncover the PVTPP corner at which the ECD has the worst-case output value. By using the present method, a designer does not have to simulate the ECD at each and every PVTPP corner, which can save considerable time or computing resources.

Figure 1:
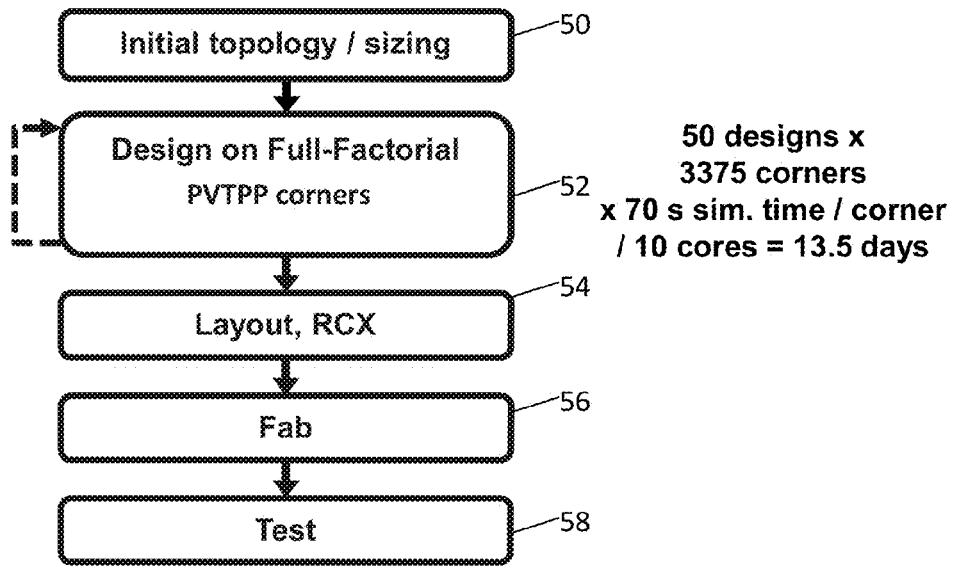
FIG. 1 shows a flowchart of a prior art method of designing an electrical circuit.
Figure 2:
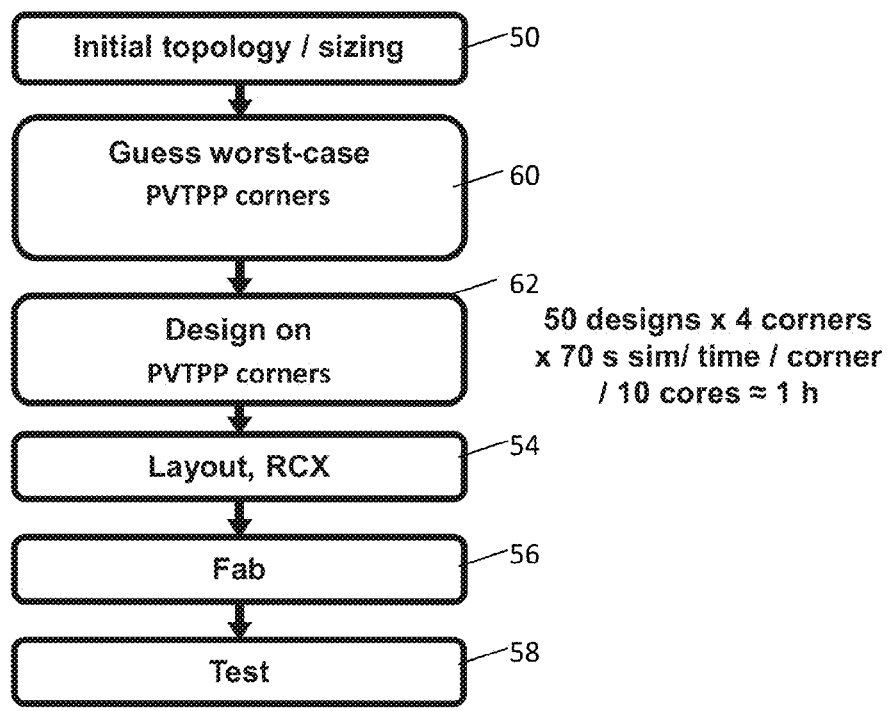
FIG. 2 shows a flowchart of another prior art method of designing an electrical circuit.
Figure 3:
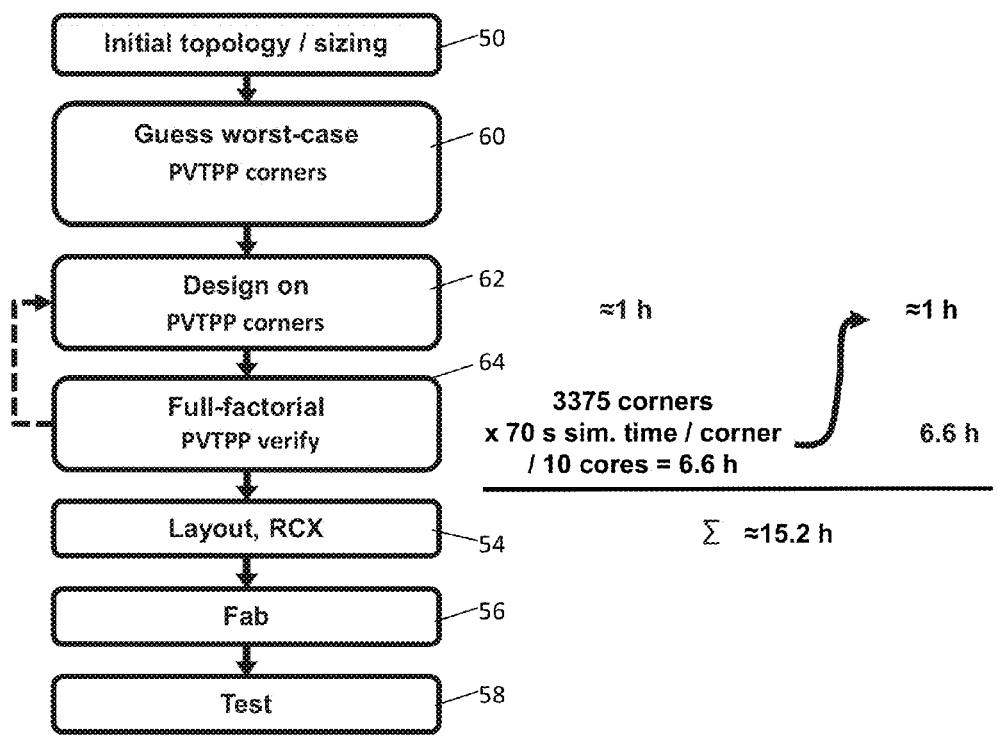
FIG. 3 shows a flowchart of yet another prior art method of designing an electrical circuit.
Figure 4:
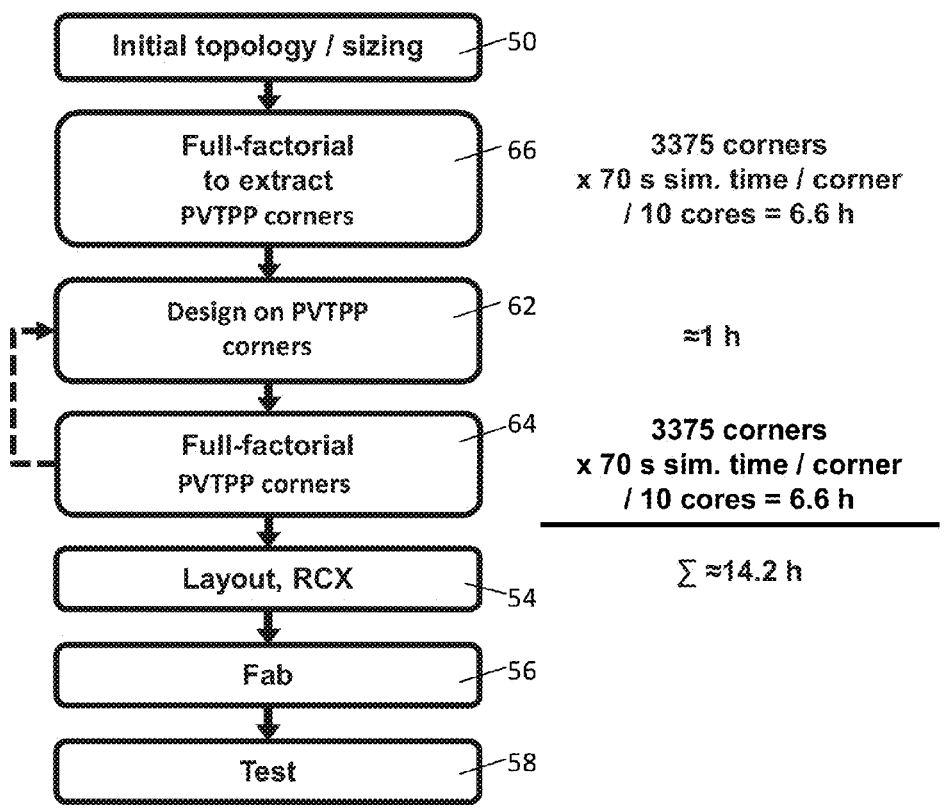
FIG. 4 shows a flowchart of an additional prior art method of designing an electrical circuit.

FIG. 5 shows an example of a flow of a method of the present disclosure. As will be described in detail below, the flow of FIG. 5 can rapidly handle PVTPP corner extraction, and PVTPP verification. The exemplary flow of FIG. 5 is similar to that of FIG. 4, but replaces the full-factorial PVTPP actions with what can be termed fast-factorial PVTPP actions.

In detail, the flow of FIG. 5 is as follows. At action 70, there is initial topology selection and sizing of an ECD. Then, at action 72, the designer invokes a tool to efficiently extract worst-case PVTPP corners. The extraction of the worst-case PVTPP corners is effected with respect to a total number of PVTPP corners for the ECD.

At action 74, the designer designs against these extracted PVTPP corners, i.e., changes design variables (e.g., widths and lengths of devices) of the ECD to determine design variable values to improve output performance values. Following this, at action 76, the designer can invoke the Fast PVTPP tool again, to verify that the worst-case PVTPP corners are found. If some new, worst-case PVTPP corners are uncovered during fast PVTPP verification, the flow of FIG. 5 can loop back to action 74 where the design can modify the design variables of the ECD against the new, worst case PVTPP corners. If no new, worst-case PVTPP corners are uncovered, the flow proceeds to action 78, i.e., to design layout and parasitics extraction. At action 80, the ECD proceeds to fabrication and is tested at action 82.

In the example of FIG. 5, the number of simulations needed for corner extraction (action 72) on the example circuit, for fast-factorial PVTPP versus full-factorial PVT, where the Fast PVTPP uses a method described further below, is about 12.2 times fewer. That is, fast-factorial PVTPP found exactly the same worst-case corners as full-factorial PVTPP but with 12.2 times fewer simulations. In terms of runtime, assuming 70 seconds per simulation (per corner), and with the simulations running on 10 cores, the full-factorial PVTPP approach required about 6.6 hours while the fast-factorial PVTPP approach of the present disclosure requires about 32 minutes.

In terms of the fast-factorial PVTPP verification action 76, in the present example, the fast-factorial PVTPP verification found the same worst-case corners as full-factorial PVTPP verification, but with 9.1× fewer simulations; and the runtime has gone from 6.6 hours to 43 minutes.

As a design iteration, shown at action 74, can typically require about an hour, the time taken by such an iteration is now comparable to the time taken by PVTPP corner extraction 74 (32 minutes in the present example) or PVTPP verification (43 minutes in the present example).

The basis of fast-factorial PVTPP corner extraction (72) and of the fast-factorial PVTPP verification (76), as described in the present disclosure, is casting the PVTPP corner extraction and the PVTPP verification as global optimization problems, and solving these global optimization problems using any suitable technique.

An ECD will have performance metrics (e.g., power consumption, bandwidth, gain, etc.) as well as PVTPP variables. The PVTPP corner extraction and PVTPP verification aspects of the present disclosure rely on a search, through a space defined by the PVTPP variables, of candidate PVTPP corners, to minimize, or, depending on the nature of the performance metric, maximize an output of the performance metric. That is, for a given PVTPP corner, the ECD is simulated at various PVTPP corners to obtain simulation data that includes a simulated output of a performance metric of the ECD. If the performance metric in question is power consumption and if it is required to have low value, then PVTPP corners (corners that maximize the output value of the power consumption performance metric) are sought in the extraction and verification actions 72 and 76. Under that problem specification, the aim is to solve the optimization problem reliably, with as few simulations as possible. For example, if the performance metric in question is gain, and if it is required to have a high value, the PVTPP corner or corners that minimize the output value of the gain performance metric are sought in the extraction and verification actions 72 and 76.

As will be shown in the following examples, the optimization problem is a global one in that it is independent of any "starting point" input PVTPP corners, and the solution to this global optimization problem is not at a local optima (maxima or minima, depending on the performance metric). This addresses the designer's need of finding the worst-case PVTPP corner, and if implemented well, has both good accuracy (finds the true worst-case) and speed (has low number of simulations).

FIG. 6 illustrates the concept of local and global maxima. FIG. 6 shows an example of a plot of power (power consumption) of an ECD as a function of temperature for the ECD. In this example, once the ECD is finalized, the power consumption performance metric of the ECD should be low. Therefore the worst-case value of power is high. The dots show the response of the ECD's power to temperature. The dots can be obtained through SPICE simulations. The idea in this optimization is to try different x-values (different temperatures), measuring (simulating) the y-value (power), and using feedback to uncover other x-values that ultimately maximize the y-value (power) to find the worst-case. The top of the hill 84 in FIG. 6 is a local optimum in that none of the nearby x-values have a higher y-value. We do not want the Fast PVTPP method (corner extraction or verification) to get stuck on such a local optimum. The fast PVTPP method should instead find the top of the hill 86 which is the global optimum. In other words, in all possible values of temperature, it gives the worst-case output performance (in this example, maximum power consumption). In another example, if the performance metric of the ECD is required to be high (e.g., gain of an ECD), then the worst-case value is low, and the PVTPP extraction and verification actions will seek PVTPP corners that minimize the performance metric in question.

We now elaborate on what a global optimization problem is. Consider x as a point in PVTPP space, i.e., a PVTPP corner. Therefore x has a value for the model set (or for each device type if separate per-device models are used) $V_{dd}$, $R_{load}$, $C_{load}$ temperature T, etc. We are given the discrete set of NC possible PVTPP corners $X_{all}=\{x_1, x_2, \ldots, x_{NC}\}$, and a SPICE-simulated output response to each corner f(x). We aim to find x*, the "worst-case" or "optimal" PVTPP corner which gives the worst case or optimal f(x) (minimum or maximum f(x), depending on the performance metric). Collecting this together in an optimization formulation, we get:

$$x^*=\mathrm{argmin}(f(x)) \text{ or } x^*=\mathrm{argmax}(f(x))$$

subject to x being comprised in $X_{all}$.

With respect to the desirability of speed and reliability, the challenge is to solve the global optimization problem with as few evaluations of f(x) as possible (minimal number of simulations), yet reliably find the x* returning the global minimum or maximum (true worst-case corner).

With PVTPP corner extraction and verification cast as global optimization problems, it is possible to consider various global optimization approaches to solve this global optimization problem. Global optimization is a large field on its own, spanning techniques that include, amongst others, "Branch & Bound," "Multi-Coordinate search" (MCS), "Model-Building Optimization" (MBO) (e.g. Jones, Sasena, and Welch, Journal of Global Optimization, 1998), "Simulated Annealing" (SA) (Kirkpatrick, Science, 1983), and Evolutionary Strategies (Hansen and Ostermaier, MIT Press Evolutionary Computation, 2001). The use of any of these techniques is within the scope of the present disclosure. The following shows examples that use model-building optimization.

The overall approach is to cast PVTPP verification (or corner extraction) as a global optimization problem, and solve the problem by using any suitable global optimization technique, such as, for example, Model-Building Optimization (MBO).

MBO-based fast PVTPP verification and extraction can be rapid because it builds regression models that make maximal use of all previous simulations, in order to choose the next round of simulations. MBO-based fast PVTPP verification and extraction can use an advanced modeling approach called Gaussian Process Models (GPMs). GPMs are arbitrarily nonlinear, making no assumptions about the mapping from PVTPP variables to outputs. Fast PVTPP is reliable because it finds the true worst-case corners, assuming appropriate stopping criteria. Fast PVTPP is user-friendly and easy to adopt because it lends itself well to visualization, and its algorithmic flow is easy for designers to understand. GPMs can also be referred to as a Kriging technique.

As discussed, PVTPP corner extraction and PVTPP corner verification are actually two distinct tasks with potentially different algorithms. Verification can take more simulations than corner extraction, but should be accurate in finding the actual worst-case corners.

Figure 7:
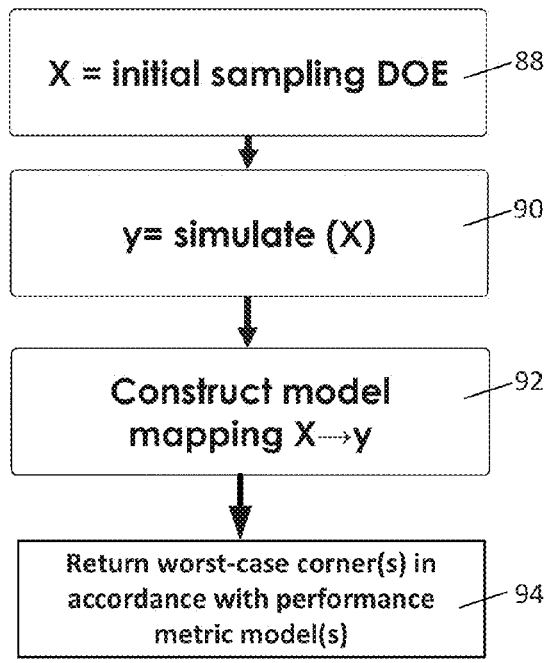
FIG. 7 shows a flowchart of a method of extracting PVTPP corners in accordance with certain examples of the present disclosure.
Figure 8:
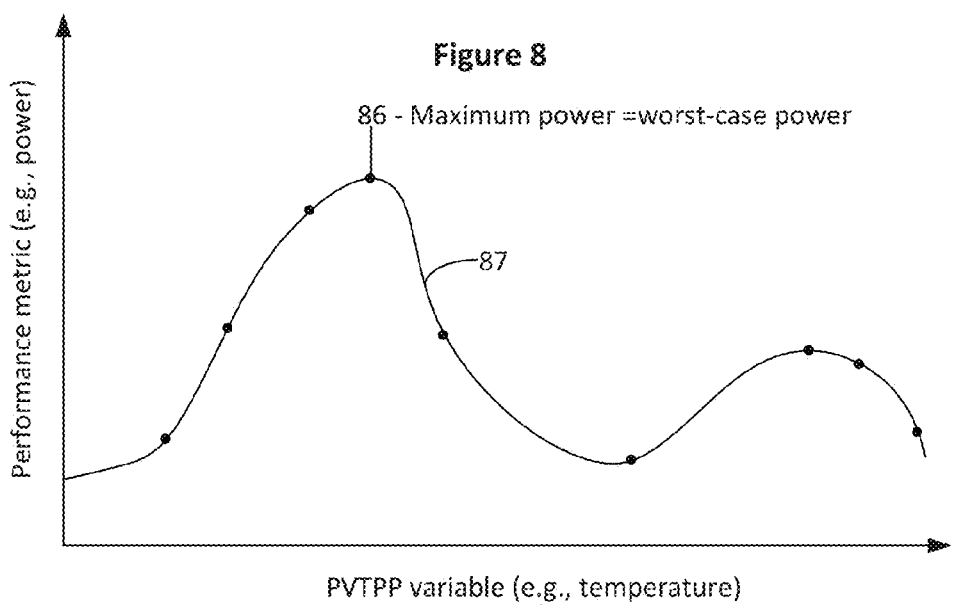
FIG. 8 shows a plot of power as a function of temperature for an exemplary electrical circuit design.

While the focus of this disclosure is PVTPP corner verification, we provide an example implementation of PVTPP corner extraction, using model-building. PVTPP corner extraction is for finding PVTPP corners against which the designer can subsequently design an ECD. FIG. 7 shows a flowchart of an example of PVTPP corner extraction method according. In this case, it uses an MBO-style global optimizer, but without an adaptive feedback loop. Therefore it uses fewer simulations, but is less accurate in finding the true worst-case PVTPP corner. With respect to an ECD, PVTPP corner extraction starts by drawing a set of initial PVTPP corners (points) at action 88. These initial PVTPP corners are obtained from the PVTPP variables space discussed above. Then, at action 90, the ECD is simulated (e.g., through a SPICE simulation) and a performance metric value (y value) is obtained for each PVTPP corner. Subsequently, at action 92 a model mapping the PVTPP corners to the simulated performance metric values (X→y) is constructed. FIGS. 8 and 9 shows two examples of such mappings (models). FIG. 8 is the same a FIG. 6 and shows that PVTPP corner 86 correspond to the maximum value of the power consumption of the ECD as a function of temperature. A model of power as a function of temperature, represented by the line 87 is also shown. As such, PVTPP corner 86 will be returned as a worst case corner at action 94. FIG. 9 is a plot of gain as a function of voltage for the ECD in question. In this case, the PVTPP corner 96 corresponds to the minimum value of gain as a function of voltage. A model of gain as a function of voltage, represented by the line 89 is also shown. As such, the PVTPP corner 96 will also be returned as a worst case corner at action 94.

Whereas FIG. 7 showed a flowchart of a Fast PVTPP corner extraction method using MBO, FIG. 10 shows a flowchart of a Fast PVTPP verification method using MBO, according to certain examples of the present disclosure. With respect to an ECD, Fast PVTPP verification starts by drawing a set of initial PVTPP corner (points) at action 88. This can be effected, for example, by DOE sampling. Then, at action 90, the ECD is simulated (e.g., through a SPICE simulation) and performance metric values for the extracted PVTPP corners (y values) are obtained. Subsequently, at action 92, a model mapping the extracted PVTPP corners to the simulated performance metric values (X→y).

At action 97, a new PVTPP corner is selected in accordance with both the model and the uncertainty of the model. Selection uses the model's prediction of the worst-case, as well as the model's uncertainty, in order to account for model "blind spots". Then, at action 98, the new PVTPP corner is simulated and the associated performance metric values (y value) are obtained. The new PVTPP corner and the new performance metric value are added to the previously determined PVTPP corners and performance metric values. At action 99, a determination is made if the algorithm's state satisfies a stopping criterion. If the algorithm state does not meet any stopping criteria, the method proceeds back to action 92 where the model is updated in accordance with the new PVTPP corner and in accordance with new PVTPP corner performance metric values.

As such, PVTPP fast verification proceeds by iteratively choosing new PVTPP corners via modeling, and then simulating the new PVTPP corners. It repeats the modeling/simulating loop until, for example, a stopping criteria, where the model is 95% confident that worse output values are no longer possible among the unsimulated PVTPP corners, is met.

We now detail the actions of FIG. 10 in more detail and provide examples for the various actions 88-99.

Action 88—initial samples: Fast PVTPP can generate a set of initial samples (corners) $X=X_{init}$ in PVTPP space using, for example, Design of Experiments (DOE); see Montgomery, D.C., 2004, *Design and Analysis of Experiments*, 6$^{th}$ Edition, Wiley. Specifically: the full set of PVTPP corners is bounded by a hypercube; DOE can select a fraction of the corners of the hypercube in a structured fashion. For example, in a 3-dimensional hypercube with 8 corners, a structured set of corners might be 3 corners that are farthest from each other.

Action 90—Simulate initial samples (PVTPP corners). This is can be SPICE simulations running on the initial samples, to get an output performance measure y for each sample: $y=y_{init}=f(X_{init})$.

Action 92—Construct a model mapping X→y. Here, Fast PVTPP can construct a regressor (regression model) mapping the PVTPP input variables to the SPICE-simulated output performance value. The choice of regressor can be important: for example, a linear or quadratic model could make unreasonably strong assumptions about the nature of the mapping (i.e. assume linear or quadratic), which may not be appropriate. We may not want to make any such assumptions, because we do not know what the actual mapping is. Rather, the regressor should be able to handle arbitrary nonlinear mappings. Furthermore, the regressor should not only predict an output value for unseen input PVTPP points, it should also be able to report its confidence in that prediction. Confidence should preferably approach 100% (0% error) at points that have previously been simulated, and increase with distance from simulated points.

An example of an approach that fits these criteria is Gaussian Process Models (GPMs, a.k.a. Kriging; see Cressie, N., 1989, *Geostatistics*, The American Statistician, Vol. 43, pp. 192-202). GPMs exploit the relative distances among training points, and the distance from the input point to training points, while predicting output values and the uncertainty of the predictions.

Action 97—once the model is constructed at action 96, it can be used to choose the next PVTPP corner $x_{new}$ from the remaining candidate corners $X_{left}=X_{all}-X$. One approach might be to simply choose the x that gives worst-case (e.g. minimum) predicted output value g(x):

$X_{new}=\text{argmin}(g(x))$ subject to $x$ in $X_{left}$.

However, this can be problematic: while such an approach optimizes f(x) in regions near worst-case (e.g. minimum) values that it has seen, there may be other regions with few samples that cause very different behavior than predictions. These are model "blind spots", and if such a region contained the true worst-case value then this simple approach would fail.

GPMs, however, are aware of their blind spots, because they can report their uncertainty. So, we can choose PVTPP corner $x_{new}$ by including uncertainty $s^2(x)$:

$x_{new}=\text{argmin}(h(g(x),s^2(x)))$ subject to $x$ in $X_{left}$.

where h(x) is an "infill criterion" that combines both predicted value g(x) and uncertainty $s^2(x)$ in some fashion. In GPMs, $s^2(x)$ is variance and s(x) is standard deviation of the GPM's prediction. There are many options for infill criterion h(x), but a robust one is "least-constrained bounds" option (LCB). LCB returns the $x_{new}$ that returns the minimum value for the lower-bound of the confidence interval. Mathematically, LCB is simply a weighted sum of g(x) and s(x). That is, $h_{LCB}(x)=g(x)+/-w*s(x)$ where w is the weight placed on s(x) versus g(x). On GPMs, w is also the number of standard deviations away from the predicted value; therefore g(x)+w*s (x) is the predicted upper bound and g(x)−w*s(x) is the predicted lower bound, where for example w=2.0 for 95% confidence (according to the Gaussian distribution). See Sasena, M. J., 2002, *Flexibility and Efficiency Enhancements for Constrained Global Optimization with Kriging Approximations*, Ph.D. thesis, University of Michigan.

Action 98—Calculate new y values. This can simply be SPICE simulations running on the new sample: $y_{new}=f(x_{new})$. We update all the training data with the latest point: $X=X \cup x_{new}$, and $y=y \cup y_{new}$.

Action 99—Stop if converged. Here, Fast PVTPP can stop once it is confident that it has found the true worst-case. Specifically, it can stop if it has determined that there is very low probability of finding any output values that are worse than the ones it has seen thus far. For additional robustness, it is possible for Fast PVTPP to do a final check: it simulates at its biggest blind spots (highest uncertainty x points), and if that does not change the worst-case seen, then it stops.

FIGS. 11 and 12 shows two iterations of a model-building optimizer (MBO) for global optimization-based Fast PVTPP verification on an illustrative, one-dimensional problem. In this case, the worst-case output performance value is a maximum, so the optimizer's aim is to maximize the output performance value. FIG. 11 shows the initial few steps of the algorithm. It is a plot of the performance metric y as a function of a PVTPP variable x. At action 88 of FIG. 10, the initial PVTPP corner samples were drawn. These are the x-values of the corners 100 in FIG. 11. At action 90 of FIG. 10, these samples were simulated, giving the y-values of the corners 100 in FIG. 11. At action 92 of FIG. 10, a model mapping PVTPP corners to output values is constructed; this is depicted as line 102 in FIG. 11. The line 104 of FIG. 11 is the infill criterion h(x) of the model 102, which is a weighted sum of the model's prediction 102 and the model's uncertainty. As an x-value gets closer to a simulated x-value, h(x) approaches the predicted value, or equivalently, uncertainty approaches zero. The vertical line 106 indicates the x-value (PVTPP corner) where the infill criterion h(x) 104 is maximum. After identification of the x-value where the h(x) is maximum, the output performance is evaluated at that x-value (e.g., through SPICE simulation of the ECD in question), and the x-value and the performance metric value are used to update the model 102. The new simulated PVTPP corner and updated model are shown in FIG. 12.

FIG. 12 shows a plot of a output performance y as a function of a PVTPP variable x, for the PVTPP corners 100 at action 88 of FIG. 10, and for the x-value (PVTPP corner) 101 determined as being the value at which the h(x) 104 of FIG. 11 is maximum. The model 102 has been changed (reiteration of action 92) in accordance with the x-value of the point 101. The vertical line 108 in FIG. 12 indicates the x-value where the h(x) 104 is maximum, which can be used to further refine the model 102. The h(x) 104 as changed in accordance with the change in the model 102.

FIG. 13 shows an example convergence plot for the MBO-based Fast PVTPP verification algorithm on an example problem, and will be used to illustrate some aspects of the algorithm's behavior, and some possible stopping criteria. The y-axis is performance values (in this case slew of a buffer chain circuit). The x-axis is the PVTPP corner sample, in the order that it was simulated. Dots 110 are simulated PVTPP corners. The x-values of the PVTPP corners to the left of the vertical line 200 were obtained at the initial sampling action 88 of FIG. 10, and their corresponding output values (performance metric values) were calculated at action 90 of FIG. 10. A model is constructed (action 92 of FIG. 10) using the PVTPP corners on the left of the vertical line 200. With the model constructed, the next PVTPP corner is selected in accordance with the model's predicted value g(x) and its uncertainty $s^2(x)$ using the LCB infill criterion $h_{LCB}(x)$. Continuing the description of the convergence curve in FIG. 13, after the model has been constructed, the first PVTPP corner, $x_{new}$, selected at reference numeral 202's x-value. This point is selected because it has the maximum $h_{LCB}(x)$ value of all candidate PVTPP corners that have not yet been simulated. Associated with the chosen corner $x_{new}$ are a predicted output value $g(x_{new})$, uncertainty $s^2(x_{new})$, predicted lower bound $g(x_{new})-w*s(x_{new})$, and predicted upper bound $g(x_{new})+w*s(x_{new})$. Because the infill criterion is LCB, $h_{LCB}(x_{new})$ is equivalent to the predicted upper bound $g(x_{new})+w*s(x_{new})$.

Continuing the description of the convergence curve in FIG. 13, the chosen corner $x_{new}$ is then simulated, to get an associated simulated output performance value, which is the y-value of FIG. 13 point 202. The chosen PVTPP corner $x_{new}$ and its simulated output y-value are added to the overall X,y dataset. Then, the algorithm checks to see if it has converged (action 99 of FIG. 10). Since the algorithm has not converged yet, it re-loops back to action 92 in FIG. 10.

Continuing the description of the convergence curve in FIG. 13, the algorithm does another iteration (in accordance with actions 92-97 of FIG. 10): it constructs a new model from the X, y data, finds the next $x_{new}$ PVTPP corner that maximizes h(x), simulates at the next $x_{new}$, and checks whether to stop. The resulting chosen PVTPP corner and simulated y-value is the reference point 203 in FIG. 13. This next $x_{new}$ also has an associated predicted value, predicted upper bound, predicted lower bound, and simulated value.

Continuing the description of the convergence curve in FIG. 13, the algorithm does another iteration (in accordance with actions 92-97 of FIG. 10), resulting in reference point 204 in FIG. 13. The algorithm does another iteration, and another, and so on until a stopping criterion is hit. To the right of vertical line 200 in FIG. 13, each "+1" of the x-axis is another iteration; therefore the algorithm has performed more than 100 iterations. FIG. 13 has lines to illustrate various aspects of the algorithm's convergence. FIG. 13 lines 112, 116, and 114 represent the predicted output performance value, predicted upper bound, and predicted lower bound respectively for the model at each iteration. FIG. 13 line 118 shows the maximum simulated value seen up until that iteration (the maximum y-value of any of the simulated dots 110 up until that iteration). As the algorithm takes multiple iterations of actions 92-97 of FIG. 10, the simulated performance output value increases to a maximum value of about y=88 after about 35 PVTPP corner samples. This is the worst-case output performance value, and the PVTPP corner that caused that value is the worst-case PVTPP corner.

FIG. 13 also illustrates possible stopping criteria. At PVTPP corner sample number 50, the predicted upper bound 114 of is clearly below the maximum simulated output value (worst-case corner found) line 118. As such, the iterative process of FIG. 10 could stop at this sample number 50 and the designer could be confident that the ECD will have found the worst-case corner. Or, if the designer wanted to be even more confident, he could let the algorithm run for a pre-set number of iterations after the upper boundary 114 gets lower than the maximum simulated value 118. The more iterations waited, the more confidence he would have. For example if he waited 110 iterations, for a total of 160 samples (far right of the curve), then he will observe the whole convergence curve of FIG. 13, and have a very high degree of confidence that no more worst-case corners will be found.

FIG. 14 shows a convergence curve like FIG. 13, on a different problem. In this case the aim is to find the worst-case (maximum) performance for delay of a buffer chain circuit. There are 50 initial samples, to the left of vertical line 200. The optimizer starts its iterations at point 210, and continues with subsequent points to the right. In this plot, there are 29 iterations, for a total of 50+29=79 simulations. FIG. 13 illustrates the benefit of more conservative stopping criteria. If the algorithm stopped simply when the predicted upper bound 114 was less or equal to the maximum simulated output value so far 118, it would have stopped at iteration 62. Therefore it would have missed the PVTPP corner in iteration 63, which had a higher simulated value than the predicted upper bound, and it would not have found the true worst-case (maximum) PVTPP corner. This is an example of the model having error in its prediction of upper bound, or equivalently, in its predicted uncertainty. To overcome this, one can simply use a more conservative stopping criterion, like the one discussed in the previous paragraph: let the algorithm run for a pre-set number of iterations after the upper boundary 114 gets lower than the maximum simulated value 118. In the example of FIG. 14, the algorithm would only stop 14 iterations after the upper boundary got less than the lower boundary. This allowed it to avoid prematurely stopping at iteration 62 (and not getting the true worst-case PVTPP corner); instead it stopped at iteration 79 and did get the true worst-case PVTPP corner).

FIG. 15 show a convergence curve like FIG. 13, on a different problem. In this case the aim is to find the worst-case (maximum) performance for a circuit's noise margin. There are 45 initial samples, to the left of vertical line 200. The optimizer starts its iterations at point 220, and continues with subsequent points to the right. In this plot, there are 145 iterations, for a total of 145+45=190 simulations. FIG. 15 illustrates that sometimes convergence can take more simulations. In this problem, the predicted upper bound 114 did not drop below the maximum simulated value so far 118 until PVTPP corner sample number 155. It then took another 25 simulations to converge with more confidence.

Figures 16, 17:
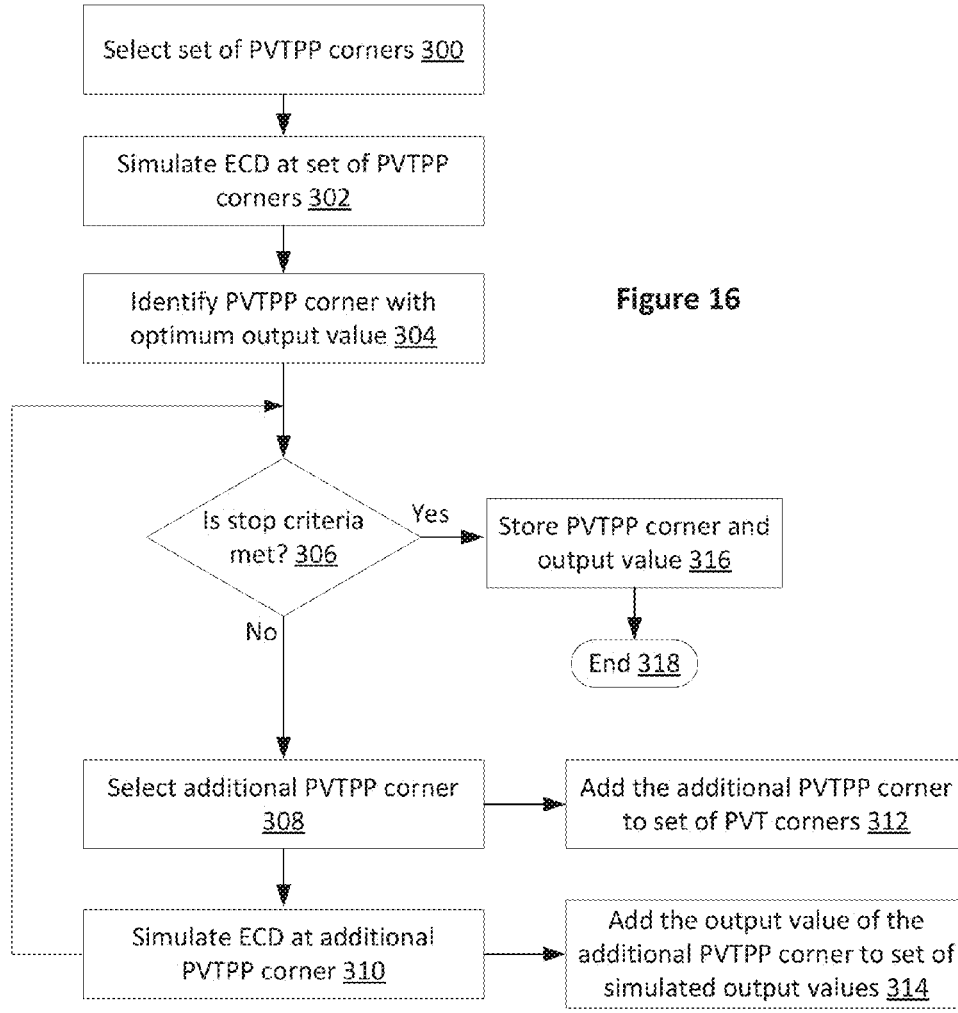
FIG. 16 shows a flowchart of a method of finding the PVTPP corner with the worst-case optimum simulated output performance in accordance to certain examples of the present disclosure.
FIG. 17 shows a non-transitory, computer-readable medium having instructions recorded thereon, in accordance with certain examples of the present disclosure.

FIG. 16 shows another flowchart of a method according to certain examples of the present disclosure. The method is in relation to an ECD that has a defined topology and design variables with fixed design variable values. That is, the ECD is sized. The ECD also has associated thereto process, voltage, and temperature (PVT) variables that define a total number of PVTPP corners for the ECD. The ECD also has associated thereto a performance metric (or multiple performance metrics). The method of FIG. 16 is to find the PVTPP corner with the worst-case optimum simulated output performance.

At action 300, a set of PVTPP corners is selected (extracted, obtained) from the total number of PVTPP corners. The selection can be carried out in any suitable manner such as by Design of Experiments or by simply randomly selecting a subset of corners. At action 302, the ECD is simulated at the set of PVTPP corners. That is, the ECD is simulated at each of the PVTPP corners obtained at action 300. The simulations result in a simulated output value of the performance metric for each PVTPP corner of the set of PVTPP corners. The simulations at action 302 can be carried out in any suitable manner such as, for example, SPICE simulations.

At action 304, in accordance with simulated output values, the PVTPP corner of the set of PVTPP corners that has the worst-case optimum output value (optimum simulated output value) is identified. Depending on the performance metric, the optimum output value can be a maximum output value or a minimum output value. For example, if the performance metric value has a target value (target spec) that cannot be exceeded, the worst-case optimum output value in this case will be a maximum output value. Such a performance metric would be power consumption of the ECD. In another example, if the performance metric value has a target value (target spec) below which the performance metric cannot extend, the worst-case optimum output value in this case will be a minimum output value. Such a performance metric would be the gain of the ECD (or the gain of a device of the ECD).

At action 306, it is determined if the optimum simulated value meets a pre-determined stop criteria. As will be described below, there can be several different stop criteria comprised within the scope of the present disclosure.

If the stop criteria is not met, the method proceeds to action 308 where an additional PVTPP corner is selected. The selection of this additional PVTPP corner is effected in accordance with the PVTPP corners already selected at action 300 (i.e., the PVTPP corners in the set of PVTPP corners), in accordance with the simulated output values of the set of PVTPP corners, and in accordance with a pre-determined global optimization process. Examples of such global optimization processes are provided elsewhere in the present disclosure.

At action 310, the additional PVTPP corner is simulated. The simulation can be carried out in any suitable manner such as, for example, SPICE simulation. At action 312, the additional PVTPP corner is added to the set of PVTPP corners. At action 314, the simulated output value of the additional PVTPP corner is added to the set of simulated output values.

As will be understood by the skilled worker, action 312 can occur at any time after action 308, and action 314 can occur at any time after action 310.

Subsequent action 310, the method of FIG. 16 proceeds to action 306 where it is determined if the stop criteria have been met. The stop criteria, or stopping criteria, can, in the context of the present example and in the context of other examples shown elsewhere in the present disclosure, include the additional simulated output value of the performance metric failing to improve over a pre-determined number of repetitions of actions 308-310. The stop criteria can also include the additional simulated output value of the performance metric improving by less than a pre-determined percentage over a pre-determined number of repetitions of action 308-310. Further, the stop criteria can include a number of repetitions of actions 308-310 that exceeds a pre-determined maximum number of repetitions. Furthermore, the stop criteria can include the total number of PVTPP corners having been simulated. Further, the stop criteria can include having confidence that the worst-case is met, in one of various forms including: (a) in the case of MBO, the predicted upper (lower) bound is less than the maximum (minimum) simulated value seen so far; (b) in the case of MBO, the predicted upper (lower) bound remains less than the maximum (minimum) simulated value seen so far for a pre-specified number of iterations.

At action 306, if it is determined that the stop criteria has been met, the method can proceed to action 316 to store the PVTPP corner that has the optimum metric value. The method end at 318.

Additionally, there can be an action of displaying the simulated value of all PVTPP corners that have been added to the set of PVTPP corners, in the sequence that the additional PVTPP corners were added to the set of PVTPP corners, and the uncertainty of the pre-determined global optimization process. The action of displaying can occur, for example, with respect to the flowchart of FIG. 16, after action 310. As the displaying action is repeated at each iteration of the method represented by the flowchart of FIG. 310, the designer can see plots, for example, such as those shown in the examples of FIGS. 13-15, form over time. As such, the designer can see for himself the progress in the verification of the ECD with respect to the PVTPP corners In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, computer (digital computer) or other suitable processing device, and can interface with circuitry to perform the described tasks. FIG. 17 shows an example of a non-transitory, tangible computer-readable medium that has instructions stored thereon to be carried out by a processor or a computer to perform a method of the present disclosure.

The above-described embodiments are intended to be examples only. Alterations, modifications and variations can be effected to the particular embodiments by those of skill in the art without departing from the scope, which is defined solely by the claims appended hereto.

The invention claimed is:

1. A non-transitory, tangible computer-readable medium having recorded thereon instructions to be carried out by a processor to perform, in relation to an electrical circuit design (ECD), the ECD having a defined topology and design variables with fixed design variable values, the ECD also having associated thereto at least one of process, voltage, temperature, parasitics and power settings (PVTPP) variables, the PVTPP variables having associated thereto a total number of PVTPP corners, the ECD also having associated thereto a performance metric, a method of finding the PVTPP corner with the worst-case optimum simulated value of the performance metric, the method comprising:
   a) selecting a set of PVTPP corners from the total number of PVTPP corners;
   b) simulating the ECD at the set of PVTPP corners to obtain a set of simulated output values of the performance metric;
   c) in accordance with the set of PVTPP corners and in accordance with the set of simulated output values of the performance metric, determining if at least one pre-determined stop criterion is met;

d) when at least one pre-determined stop criterion is met:
  i) identifying a PVTPP corner of the set of PVTPP corners that has the worst-case optimum simulated value of the performance metric; and
  ii) storing, in a memory, the PVTPP corner that has the worst-case optimum simulated value of the performance metric and the simulated output value of the PVTPP corner that has the worst-case optimum simulated value of the performance metric;
e) when a pre-determined stop criterion is not met:
  i) selecting an additional PVTPP corner in accordance with the set of PVTPP corners, in accordance with the simulated output values, and in accordance with a pre-determined global optimization process;
  ii) adding the additional PVTPP corner to the set of PVTPP corners;
  iii) simulating the ECD at the additional PVTPP corner to obtain an additional simulated output value of the performance metric;
  iv) adding the additional simulated output value to the set of simulated output values of the performance metric; and
  iv) in accordance with the set of PVTPP corners, in accordance with the set of simulated output values of the performance metric, determining if at least one pre-determined stop criterion is met;
f) when a pre-determined stop criterion is met, proceeding to action d; and
g) when a pre-determined stop criterion is not met, repeating action e.

2. The non-transitory, tangible computer-readable medium of claim 1 wherein the stop criteria includes the additional simulated output value of the performance metric failing to improve over a pre-determined number of repetitions of action e.

3. The non-transitory, tangible computer-readable medium of claim 1 wherein the stop criteria includes the additional simulated output value of the performance metric improving by less than a pre-determined percentage over a pre-determined number of repetitions of action e.

4. The non-transitory, tangible computer-readable medium of claim 1 wherein the stop criteria includes a number of repetitions of actions e that exceeds a pre-determined maximum number of repetitions.

5. The non-transitory, tangible computer-readable medium of claim 1 wherein the stop criteria includes a pre-determined number of PVTPP corners having been simulated.

6. The non-transitory, tangible computer-readable medium of claim 1 wherein the pre-determined global optimization process has an uncertainty associated thereto.

7. The non-transitory, tangible computer-readable medium of claim 6 wherein the uncertainty is a function of each additional PVTPP corner.

8. The non-transitory, tangible computer-readable medium of claim 7 wherein the method further comprises, after action (e)(iii), displaying the simulated value of all PVTPP corners that have been added to the set of PVTPP corners, in the sequence that the additional PVTPP corners were added to the set of PVTPP corners, and the uncertainty of the pre-determined global optimization process.

9. The non-transitory, tangible computer-readable medium of claim 1 wherein the pre-determined global optimization process includes one of model-building optimization, branch and bound optimization, multi-coordinate search optimization, simulated annealing, and an evolutionary algorithm.

10. The non-transitory, tangible computer-readable medium of claim 9 wherein the pre-determined global optimization process is model-building optimization and wherein action (e)(i) includes building a model of the performance metric, the model having an uncertainty, and selecting the additional PVTPP corner in accordance with the model and in accordance with the uncertainty.

11. The non-transitory, tangible computer-readable medium of claim 10 wherein the model is a Gaussian Process Model.

12. In relation to an electrical circuit design (ECD) having a defined topology and design variables with fixed design variable values, the ECD also having associated thereto at least one of process, voltage, temperature, parasitics and power settings (PVTPP) variables, the PVTPP variables having associated thereto a total number of PVTPP corners, a method of finding, with the aid of a digital computer, the PVTPP corner with the worst-case optimum simulated value of the performance metric, the method comprising:
  a) the computer selecting a set of PVTPP corners from the total number of PVTPP corners;
  b) the computer simulating the ECD at the set of PVTPP corners to obtain a set of simulated output values of the performance metric;
  c) in accordance with the set of PVTPP corners and in accordance with the set of simulated output values of the performance metric, the computer determining if at least one pre-determined stop criterion is met;
  d) when at least one pre-determined stop criterion is met:
    i) the computer identifying a PVTPP corner of the set of PVTPP corners that has the worst-case optimum simulated value of the performance metric; and
    ii) the computer storing, in a memory, the PVTPP corner that has the worst-case optimum simulated value of the performance metric and the simulated output value of the PVTPP corner that has the worst-case optimum simulated value of the performance metric;
  e) when a pre-determined stop criterion is not met:
    i) the computer selecting an additional PVTPP corner in accordance with the set of PVTPP corners, in accordance with the simulated output values, and in accordance with a pre-determined global optimization process;
    ii) the computer adding the additional PVTPP corner to the set of PVTPP corners;
    iii) the computer simulating the ECD at the additional PVTPP corner to obtain an additional simulated output value of the performance metric;
    iv) the computer adding the additional simulated output value to the set of simulated output values of the performance metric; and
    iv) in accordance with the set of PVTPP corners, in accordance with the set of simulated output values of the performance metric, the computer determining if at least one pre-determined stop criterion is met;
  f) when a pre-determined stop criterion is met, the computer proceeding to action d; and
  g) when a pre-determined stop criterion is not met, the computer repeating action e.

13. The method of claim 12 wherein the stop criteria includes the additional simulated output value of the performance metric failing to improve over a pre-determined number of repetitions of action e.

14. The method of claim 12 wherein the stop criteria includes the additional simulated output value of the performance metric improving by less than a pre-determined percentage over a pre-determined number of repetitions of action e.

15. The method of claim 12 wherein the stop criteria includes a number of repetitions of actions e that exceeds a pre-determined maximum number of repetitions.

16. The method of claim 12 wherein the stop criteria includes a pre-determined number of PVTPP corners having been simulated.

17. The method of claim 12 wherein the pre-determined global optimization process includes one of model-building optimization, branch and bound optimization, multi-coordinate search optimization, simulated annealing, and an evolutionary algorithm.

18. The method of claim 17 wherein the pre-determined global optimization process is model-building optimization and wherein action (e)(i) includes the computer building a model of the performance metric, the model having an uncertainty, and selecting the additional PVTPP corner in accordance with the model and in accordance with the uncertainty.

19. The method claim 18 wherein the model is a Gaussian Process Model.

20. The method of claim 12 wherein the pre-determined global optimization process has an uncertainty associated thereto.

21. The method of claim 20 wherein the uncertainty is a function of each additional PVTPP corner.

22. The method of claim 21 wherein the method further comprises, after action (e)(iii), displaying the simulated value of all PVTPP corners that have been added to the set of PVTPP corners, in the sequence that the additional PVTPP corners were added to the set of PVTPP corners, and the uncertainty of the pre-determined global optimization process.

* * * * *